Oct. 24, 1967  R. CHURCHILL, JR  3,348,803

PISTON REVERSING ACTUATOR VALVE

Filed Oct. 30, 1964  2 Sheets-Sheet 1

INVENTOR
RALPH CHURCHILL, Jr.

BY
Mason, Porter, Diller & Stewart
ATTORNEYS

Oct. 24, 1967  R. CHURCHILL, JR  3,348,803
PISTON REVERSING ACTUATOR VALVE
Filed Oct. 30, 1964  2 Sheets-Sheet 2
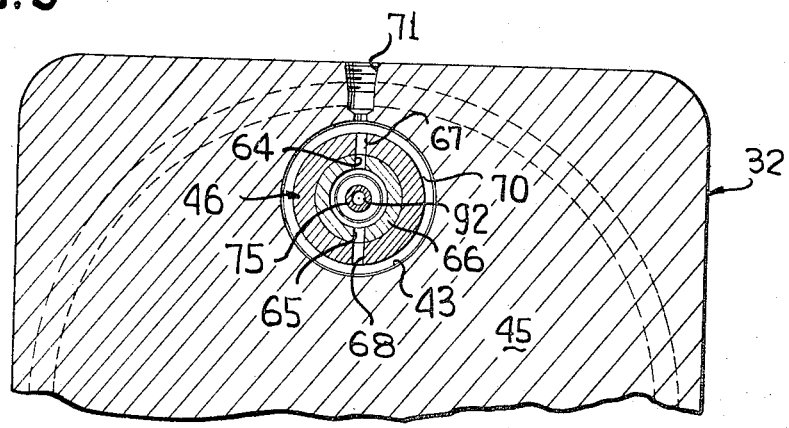
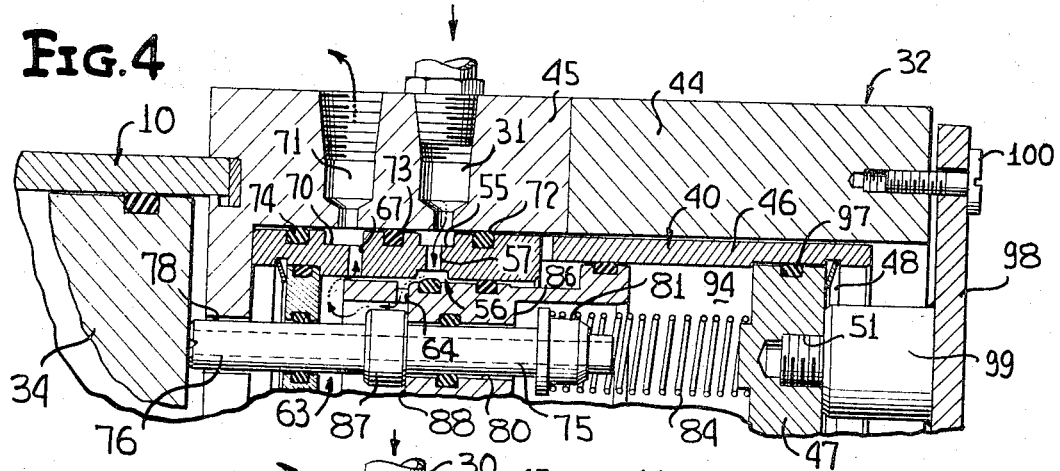
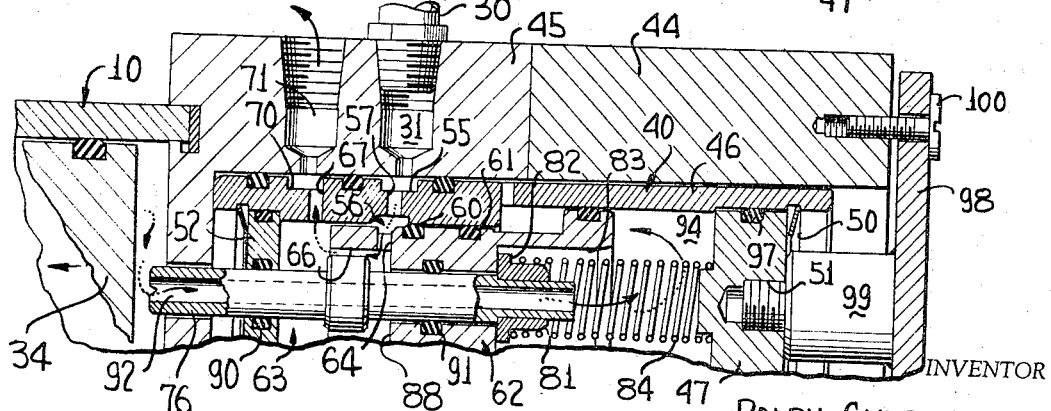
INVENTOR
RALPH CHURCHILL, Jr.
BY Mason, Porter, Diller & Stewart
ATTORNEYS United States Patent Office 3,348,803
Patented Oct. 24, 1967

3,348,803
PISTON REVERSING ACTUATOR VALVE
Ralph Churchill, Jr., Hoffman Estates, Ill., assignor to Parker-Hannifin Corporation, Cleveland, Ohio, a corporation of Ohio
Filed Oct. 30, 1964, Ser. No. 407,665
12 Claims. (Cl. 251—12)

This invention relates to a novel actuator valve for reversing the travel of a piston in a cylinder, and more particular, to an actuator valve unit adapted for installation at each end of a double acting cylinder for automatically reciprocating a piston thereof by merely supplying the valves with control fluid.

Actuator valves are presently used for operating fluid motors in systems where a supply of air under pressure is selectively introduced into and through various passageways and chambers in accordance with the position of a valve member carried by a rod which is actuated by a piston of the fluid motor. In systems which include a double-acting cylinder, an actuator valve at each end of the double acting cylinder is actuated by the piston alternately shifting an actuator rod and a valve member carried thereby of each of the actuator valves.

One of the many problems of conventional actuator valves is the inability to obtain substantially uniform reversing action of the piston irrespective of variations in the working pressure supplied to the actuator valves. An increase in the working pressure would tend to increase the speed at which the piston is reciprocated while a decrease in the working pressure could cause a corresponding decrease in the speed of the piston.

Such conventional actuator valves also include numerous elements which are individually installed in the ends of the cylinder and necessarily require an appreciable amount of installation time, and down time is similarly increased when the component parts of the actuator valve must be individually removed from the ends of the cylinder for purposes of maintenance or repair. The interiors of such actuator valves are also generally exposed to atmosphere and are thus highly susceptible to the entrance of dirt or other foreign matter which might interfere with the operation of the valves. Such valves also include numerous sealing members constructed from rubber or plastic material which would wear rapidly under the abrasive influence of dirt or other contaminants, thus reducing the efficient working lifetime of such valves.

Other actuator valves of a conventional construction also may require electrical components, such as electrical switches or timers, to control the operation of the actuator valves. The addition of such additional components necessarily increases both the cost and complexity of the fluid system.

Accordingly, it is an object of this invention to provide a novel actuator valve which is constructed of a minimum number of component parts fully enclosed in a housing which requires no electrical components for fully automatic reciprocation of a piston with which the actuator valve is associated, and provide a reversing action of the piston which is substantially uniform in time regardless of variations in working pressures.

It is another object of this invention to provide a novel actuator valve of the type described including first and second chambers in a housing, first and second passages for respectively introducing control fluid into the first chamber and venting fluid from the second chamber, a valve member movable between a first position cutting off fluid communication between the chambers and a second position placing the chambers in fluid communication, and restriction means between the second chamber and the second passage for restricting the flow of fluid from the second chamber to the second passage until pressure fluid building up in the second chamber and acting against the valve member opens the second passage to fluid communication from the second chamber whereby relatively uniform operation of the actuator valve and reciprocation of a piston associated therewith is assured.

A further object of this invention is to provide a rod for actuating the valve member between the first and second positions thereof, the rod having a bore for placing a third chamber of the actuator valve in fluid communication with the cylinder of a double acting cylinder and piston unit whereby fluid pressure in the cylinder is introduced into the third chamber to augment the movement of the valve member to the first position thereof.

It is another object of this invention to provide an actuator valve of the type described in which the valve member is slidably carried by the rod and cooperative abutment means are included between the rod and the valve member for moving the valve member from the first to the second position thereof upon the movement of the rod under the influence of the piston.

A further object of this invention is to provide an actuator valve of the type described in which each of the working components are housed in a generally closed unit, and the unit includes means for receiving a tool whereby the entire unit can be readily and quickly installed in and removed from an end portion of the cylinder.

Other objects in the invention will be apparent from the following description and from the drawings in which:

FIGURE 3 is a fragmentary sectional view taken along line 3—3 of FIGURE 2, and illustrates a plurality of aligned radial passages placing a chamber of the actuator valve in fluid communication with an exhaust port in the end portion of the cylinder.

FIGURE 4 is a fragmentary sectional view of the actuator valve of FIGURE 2, and illustrates the valve member in a position which restricts the venting of control fluid from the chamber of the actuator valve through the radial passageways and the exhaust port in the cylinder end portion.

FIGURE 5 is a fragmentary sectional view similar to FIGURE 4, and illustrates the flow of high pressure from the cylinder through a bore in the rod into a third chamber for urging the valve member to the position illustrated in FIGURE 2.

Figure 1:
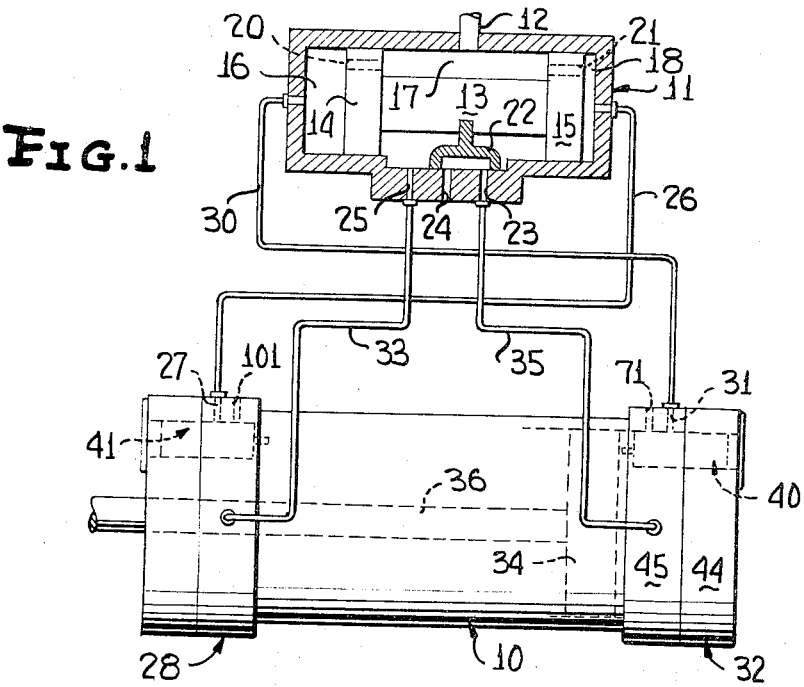
FIGURE 1 is a schematic view partially in section of a system utilizing a pair of actuator valves installed in opposite end portions of a double acting cylinder.

As shown in FIGURE 1, the system may include a double acting cylinder 10 operated by control fluid, such as air under pressure, introduced into a D-valve 11 through a conduit 12. The D-valve 11 includes a shiftable valve body 13 having cylindrical end portions 14 and 15 which divide the D-valve into a left chamber 16, a central chamber 17, and a right chamber 18. The chambers 16 and 17 are placed in fluid communication by a port 20 and a port 21 similarly places the chambers 17 and 18 in fluid communication. A valve member 22 is carried by the body 13 for establishing fluid communication between ports 23, 24 when in the position illustrated in FIGURE 1. When the body 13 of the D-valve 11 is moved to the left as viewed in FIGURE 1, the valve member 22 places the port 24 in fluid communication with a port 25.

A conduit 26 places the right chamber 18 in fluid communication with an inlet port 27 in an end portion 28 of the double acting cylinder 10. A conduit 30 thus similarly places the chamber 16 in fluid communication with an inlet port 31 (FIGURE 2) in an opposite end portion 32 of the double acting cylinder 10. A conduit 33 connected to the port 25 of the valve 11 opens into the interior of the cylinder 10 to one side of a piston 34. A conduit 35 connected to the port 23 similarly opens into the interior of the cylinder 10 at an opposite side of the piston 34. The piston 34 includes a piston rod 36 projecting outwardly through an axial opening (unnumbered) which is sealed in a conventional manner.

An actuator valve 40 which is identical to an actuator valve 41 (FIGURE 1) is housed in a pair of axially aligned bores 42, 43 in respective plates 44, 45 forming the end portion 32 of the cylinder 10.

The actuator valve 40 comprises a generally cylindrical housing 46 closed at one end portion by an end cap 47. The end cap 47 is secured in place by an annular retaining ring 48 received in a groove 50 of the housing 46. An axial threaded bore 51 in the end cap 47 is provided to receive a tool for installing and removing the actuator valve 40 in a manner to be described more fully hereafter.

An opposite end portion of the housing 46 is similarly closed by an end cap 52 secured in the housing 46 by an annular retaining ring 53 received in a groove 54.

The housing 46 is provided with a circumferential radially outwardly opening groove 55 to which pressurized control fluid, such as compressed air, is introduced into a first annular chamber 56 by means of diametrically opposed passages 57, 58 (FIGURE 2) in fluid communication with the left chamber 16 of the D-valve 11 through the inlet port 31 and the conduit 30 (FIGURE 1). A pair of O-rings 60, 61 received in grooves (unnumbered) of a generally sleeve-like valve member 62 cut off fluid communcation from the first annular chamber 56 to a second chamber 63 (FIGURES 4 and 5) when the valve member 62 is in the position illustrated in FIGURE 2 of the drawings. When the valve member 62 is shifted from the position illustrated in FIGURE 2 through the positions thereof illustrated in FIGURES 4 and 5, in a manner to be described more fully hereafter, the first chamber 56 is placed in fluid communication with the second chamber 63 through a pair of diametrically opposed passage means 64, 65 opening through a tubular end portion 66 of the valve member 62. The second chamber 63 is open to atmosphere in a second position of the valve member 62 (FIGURE 5) through a pair of diametrically arranged passages 67, 68 terminating radially outwardly of the housing 46 at an outwardly opening circumferential groove 70 in alignment with an exhaust port 71 in the plate 45 of the end portion 32.

O-rings 72-74 received in associated grooves (unnumbered) in the housing 46 seal the housing relative to the bore 43 in the plate 45 of the end portion 32, as is clearly illustrated in FIGURES 2 through 5 of the drawings.

Figure 2:
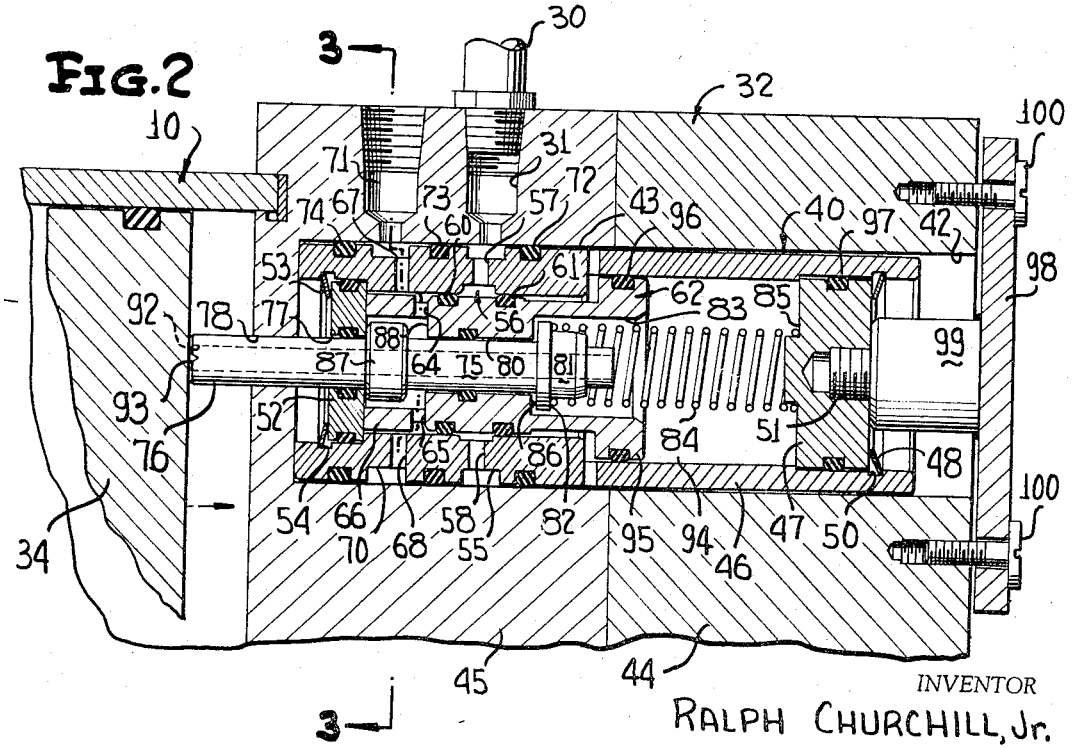
FIGURE 2 is an enlarged fragmentary sectional view of one end portion of the cylinder of FIGURE 1, and illustrates the various components of the actuator valve.

The valve member 62 is moved between the positions illustrated in FIGURES 2 and 5 of the drawings by a generally cylindrical actuator rod 75 having an end portion 76 slidably received through an opening 77 in the end cap 52 and projecting through a bore 78 in the plate 45 into the interior of the cylinder 10. The rod 75 is slidably received in an axial bore 80 of the valve member 62. A collar 81 having a generally annular spring seat 82 is secured to an opposite end portion (unnumbered) of the rod 75 positioned in a counterbore 83 of the valve member 62. A spring 84 seated against the annular seat 82 of the collar 81 and a seat 85 of the end cap 47 normally urges the actuator rod 75 to the position illustrated in FIGURE 2 of the drawings. The spring 84 likewise urges the valve member 62 to the position illustrated in FIGURE 2 of the drawings by the contact between the collar 81 carried by the rod 75 and an annular wall or surface 86 of the counterbore 83.

Abutment means 87 in the form of a peripheral enlargement of the rod 75 is normally housed in the tubular end portion 66 of the sleeve member 62. As the piston 34 (FIGURE 2) contacts the end portion 76 of the rod 75 during left-to-right movement thereof as viewed in this figure, the abutment means 87 is brought into abutting contact with an annular abutment wall 88 of the valve member 62. In this manner movement of the rod 75 under the influence of the piston 34 moves the valve member 62 from the position illustrated in FIGURE 2 to the position illustrated in FIGURE 4.

O-rings 90 and 91 in grooves (unnumbered) in the respective end cap 52 and the valve member 62 are in sealing engagement with the rod 75.

The rod 75 is provided with an axial bore 92 opening into the interior of the cylinder 10 through the end portion 76 which is peripherally relieved by a pair of diametrically related V-shaped grooves 93. The bore 92 opens into a third chamber 94 of the housing 40 between a radially enlarged portion 95 of the valve member 62 and the end cap 47. O-rings 96, 97 in grooves (unnumbered) in the respective valve member 62 and the end cap 47 are in sealing contact with the interior surface of the housing 46.

The actuator valve 40 as well as the identical actuator valve 41 is positioned in the aligned bores 42, 43 by valve means of a plate 98 having an axial spacer 99 abutting the end cap 47. The plate 98 is secured to the plate 44 of the end portion 32 by a plurality of identical fasteners 100 in a manner clearly illustrated in FIGURE 2 of the drawings.

During normal operation, the actuator valves 40 and 41 are installed in the double acting cylinder 10 as shown in FIGURE 1, with the valve member 62 of the actuator valve 40 in its first position (FIGURE 2) and with the corresponding identical valve member of the actuator valve 41 positioned to permit venting through an exhaust port 101. In this position control fluid in the right chamber 18 of the D-valve 11 is exhausted through the conduit 26, the inlet port 27, the actuator valve 41 and the exhaust port 101. Since the actuator valve 40 and the valve member 62 thereof is positioned as shown in FIGURE 2 to prevent exhausting through the exhaust port 71 the pressure in the left chamber 16 of the valve 11 holds the valve member 22 in the position illustrated in FIGURE 1. In this position of the valve member 22 exhaust pressure to the right of the piston 34 in the cylinder 10 is exhausted through the conduit 35, the port 23, the valve member 22 and the port 24. Pressure in the central chamber 17 of the valve 11 pressurizes the interior of the cylinder 10 to the left of the piston 34 through the port 25 and the conduit 33 to urge the piston 34 from left-to-right as viewed in FIGURE 1 until the piston 34 contacts the end portion 76 of the rod 75.

As the piston 34 continues its movement, the abutment means 87 of the rod 75 contacts the annular wall 88 of the valve member 62 and urges the valve member 62 from the position illustrated in FIGURE 2 to the position shown in FIGURE 4 against the biasing force of the spring 84. During this movement of the valve member 62, the O-ring 60 breaks sealing contact with the housing 46 and the first chamber 56 is placed in fluid communication with the second chamber 63 through the passages 64, 65, as shown in FIGURE 4. The fluid in the left chamber 16 of the valve 11 now begins to vent through the conduit 30, the inlet port 31, the groove 55, the passages 57, 58, the first chamber 56, the passages 64, 65 and the second chamber 63. At this point the chamber 63 is not fully open to atmosphere through the passages 67, 68, the groove 70 and the exhaust port 71, as illustrated in FIGURE 4 of the drawings. In this position, the tubular end portion 66 of the valve member 62 occupies an intermediate position in which a portion thereof overlies and is minutely spaced from the housing portion defining the passages 67, 68. Thus, restricted flow occurs outwardly of the second chamber 63, the restriction between the housing 46 and the tubular end portion 66, the passages 67, 68, the groove 70 and the exhaust port 71. This restriction causes a delay in the opening of the second chamber 63 to atmosphere until such time as pressure builds up in the chamber 63 to a sufficient extent to rapidly move the valve member 62 to the second position (FIGURE 5) to fully open the chamber 63 to atmosphere. The left chamber 16 of the valve 11 now freely exhausts over the flow path just described causing a reduction in the pressure of the left chamber 16 and a pressure build up in the right chamber 18 upon the closing of the port 101 (FIGURE 1) to atmosphere. The air in the central chamber 17 of the valve 11 enters the right chamber 18 through the bore 21 causing an increase in the pressure in the right chamber 18 and a shifting of the valve member 22 from the position shown in FIGURE 1 to a position placing the ports 24 and 25 in fluid communication with each other and the port 23 in fluid communication with the central chamber 17.

With the valve member 22 shifting to the left as viewed in FIGURE 1, high pressure from the central chamber 17 of the valve 11 enters the interior of the cylinder 10 to the right of the piston 34 through the port 23 and the conduit 35. This high pressure begins moving the piston 34 to the left (FIGURE 5) and enters the third chamber 94 through the bore 92 in the rod 75. As the high pressure enters the chamber 94 it augments the biasing force of the spring 84 and shifts the valve member 62 from the position shown in FIGURE 5 to the position illustrated in FIGURE 2 to again prevent communication between the first chamber 56 and the second chamber 66 and thus condition the actuator valve 40, as well as the actuator valve 41, for subsequent cycling identical to that just described.

The actuator valve 40, as well as the actuator 41, can be removed from the respective end portions of the cylinder 10 for purposes of maintenance or inspection by unthreading the fasteners 100 and removing the plate 98. A suitable tool (not shown) can then be introduced into the bore 42 and threaded into the threaded bore 51 of the end cap 47. The tool may then be withdrawn to remove the entire actuator valve 40 and each of the individual components thereof as a unit.

From the foregoing, it will be seen that novel and advantageous provisions have been made for carrying out the desired end. However, variations in the construction and arrangement of parts of the actuator valve of this invention may be made without departing from the spirit and scope thereof as defined in the appended claims.

I claim:

1. An actuator valve comprising a housing, first and second chambers in said housing, a first passage for introducing fluid into said first chamber, a second passage for venting fluid from said second chamber, and valve means for controlling the passage of fluid from said first chamber to said second chamber, said valve means including a valve member movable between a first position cutting off fluid communication between said chambers and a second position placing said chambers in fluid communication, means maintaining said valve member in said first position, means for moving said valve member from said first position to said second position whereby fluid passes from said first passage through said first chamber into said second chamber, restriction means between said second chamber and said second passage for restricting the flow of fluid from said second chamber to said second passage, a third chamber, and a third passage in fluid communication with said third chamber for introducing fluid therein to augment the movement of said valve member from said second position to said first position to close-off fluid communication between said first and second chambers.

2. An actuator valve comprising a housing, first and second chambers in said housing, a first passage for introducing fluid into said first chamber, a second passage for venting fluid from said second chamber, and valve means for controlling the passage of fluid from said first chamber to said second chamber, said valve means including a valve member movable between a first position cutting off fluid communication between said chambers and a second position placing said chambers in fluid communication, means maintaining said valve member in said first position, means for moving said valve member from said first position to said second position whereby fluid passes from said first passage through said first chamber into said second chamber, restriction means between said second chamber and said second passage for restricting the flow of fluid from said second chamber to said second passage, and passage means in said valve member placing said first and second chambers in fluid communication in said second position.

3. The actuator valve as defined in claim 1 wherein said third passage is in said means for moving said valve member.

4. An actuator valve comprising a tubular housing, first and second chambers in said housing, a first passage for introducing fluid into said first chamber, a second passage for venting fluid from said second chamber, a valve member mounted for sliding movement in said housing between a first position cutting off fluid communication between said chambers and a second position permitting fluid communication between said chambers, a rod for moving said valve member to an intermediate position between said first and second positions at which partial fluid communication is established between said chambers and restricted fluid communication is established between said second passage and said second chamber, and said restricted fluid communication being established by a peripheral surface portion of said valve member overlying a portion of the housing defining said second passage whereby fluid pressure introduced into said second chamber increases and moves said valve member to said second position.

5. An actuator valve comprising a tubular housing, first and second chambers in said housing, a first passage for introducing fluid into said first chamber, a second passage for venting fluid from said second chamber, a valve member mounting for sliding movement in said housing between a first position cutting off fluid communication between said chambers and a second position permitting fluid communication between said chambers, and passage means in said valve member in fluid communication with both of said chambers in the second position of said valve member, a rod for moving said valve member to an intermediate position between said first and second positions at which partial fluid communication is established between said chambers and restricted fluid communication is established between said second passage and said second chamber, and said restricted fluid communication being established by a peripheral surface portion of said valve member overlying a portion of the housing defining said second passage whereby fluid pressure introduced into said second chamber increases and moves said valve member to said second position.

6. An actuator valve comprising a tubular housing, first and second chambers in said housing, a first passage for introducing fluid into said first chamber, a second passage for venting fluid from said second chamber, a valve member mounting for sliding movement in said housing between a first position cutting off fluid communication between said chambers and a second position permitting fluid communication between said chambers, a rod for moving said valve member to an intermediate position between said first and second positions at which partial fluid communication is established between said chambers and restricted fluid communication is established between said second passage and said second chamber, said rod projecting through an opening at a first end portion of said housing, a bore in said rod, and said bore opening into a third chamber in said housing at an end portion opposite said first end portion whereby fluid introduced into said bore urges said valve member from the second position to the first position.

7. The actuator valve as defined in claim 6 wherein said valve member is slidably carried by said rod, and said valve member and rod include cooperative abutment means for moving said valve member from said first position to said second position upon movement of said rod toward the opposite end portion of the housing.

8. An actuator valve comprising a tubular housing, first and second chambers in said housing, a first passage for introducing fluid into said first chamber, a second passage for venting fluid from said second chamber, a valve member mounted for sliding movement in said housing between a first position cutting off fluid communication between said chambers and a second position permitting fluid communication between said chambers, a rod for moving said valve member to an intermediate position between said first and second position at which partial fluid communications is established between said chambers and restricted fluid communication is established between said second passage and said second chamber, the restricted fluid communication being established by a peripheral surface of said valve member overlying a portion of the housing defining said second passage, and cooperative abutment means between said rod and said valve member whereupon movement of said rod moves said valve member only to said intermediate position thereof through contact between said cooperable abutment means and fluid in said second chamber urges said valve member to the second position thereof and breaks the contact between said abutment means.

9. An actuator valve comprising a tubular housing having opposite first and second end portions, first, second and third chambers in said housing, a first passage for introducing fluid into said first chamber, a second passage for venting fluid from said second chamber, a rod mounted for reciprocal movement in said housing, an end portion of said rod projecting outwardly from the first end portion of the housing, a valve member including a sleeve-like body slidably carried by the rod for movement between a first position in which fluid communication between the first and second chambers is prevented and a second position placing the first and second chambers in fluid communication, an abutment of said rod engageable with an abutment of said sleeve, spring means urging said abutments into contact in said first position, and a bore in said rod placing the exterior of the housing in fluid communication with the third chamber.

10. An actuator valve comprising a tubular housing having opposite first and second end portions, first, second and third chambers in said housing, a first passage for introducing fluid into said first chamber, a second passage for venting fluid from said second chamber, a rod mounted for reciprocal movement in said housing, an end portion of said rod projecting outwardly from a first end portion of the housing, a valve member including a sleeve-like body slidably carried by the rod for movement between a first position in which fluid communication between the first and second chambers is prevented and a second position placing the first and second chambers in fluid communication, an abutment of said rod engageable with an abutment of said sleeve, spring means urging said abutments into contact in said first position, and restrictor means for establishing restricted fluid communication between said second chamber and the second passage, said restrictor means including a portion of said sleeve in slightly spaced relationship to a surface portion of the housing defining the second passage in an intermediate position of said valve member between the first and second positions thereof.

11. The actuator valve as defined in claim 2 wherein said last-mentioned passage means is normally disposed in the second chamber in the first position of said valve member.

12. The actuator valve as defined in claim 4 wherein said rod is movable relative to said valve member during the movement of the latter between said first and second positions.

References Cited

UNITED STATES PATENTS

| | | | |
|---|---|---|---|
| 69,772 | 10/1867 | Colbath | 137—625.63 |
| 151,667 | 6/1874 | Loretz | 137—625.63 |
| 226,224 | 4/1880 | Demarest | 251—43 X |
| 1,111,244 | 9/1914 | Wilson | 251—282 X |
| 1,396,501 | 11/1921 | Brooks | 251—282 X |
| 1,712,245 | 5/1929 | Blyton | 137—625.3 |
| 2,888,951 | 6/1959 | Flick | 91—313 X |

M. CARY NELSON, *Primary Examiner.*

A. ROSENTHAL, *Assistant Examiner.*